United States Patent
Gutmark et al.

[11] Patent Number: 6,138,955
[45] Date of Patent: Oct. 31, 2000

[54] VORTICAL LIFT CONTROL OVER A HIGHLY SWEPT WING

[75] Inventors: Ephraim J. Gutmark; Stephen A. Guillot, both of Baton Rouge, La.

[73] Assignee: Board of Supervisors of Louisiana State University and Agricultural and Mechanical College, Baton Rouge, La.

[21] Appl. No.: 09/220,211

[22] Filed: Dec. 23, 1998

[51] Int. Cl.$^7$ ................................................... B64C 23/06
[52] U.S. Cl. ........................... 244/199; 244/207; 244/130
[58] Field of Search .................................. 244/204, 205, 244/198, 199, 130, 207

[56] References Cited

U.S. PATENT DOCUMENTS

| | | | |
|---|---|---|---|
| 2,477,461 | 7/1949 | Lee | 244/40 |
| 2,941,751 | 6/1960 | Gagarin | 244/199 |
| 3,090,584 | 5/1963 | Kuchemann et al. | 244/199 |
| 3,471,107 | 10/1969 | Ornberg | 244/199 |
| 3,480,234 | 11/1969 | Cornish, III | 244/40 |
| 3,508,561 | 4/1970 | Cornish, III | 137/13 |
| 3,525,486 | 8/1970 | Wimpenny | 244/42 |
| 3,596,854 | 8/1971 | Haney, Jr. | 244/40 |
| 3,841,587 | 10/1974 | Freed | 244/40 A |
| 3,881,669 | 5/1975 | Lessen | 244/40 R |
| 3,936,013 | 2/1976 | Yuan | 244/40 A |
| 4,175,640 | 11/1979 | Birch et al. | 181/213 |
| 4,697,769 | 10/1987 | Blackwelder et al. | 244/199 |
| 4,860,976 | 8/1989 | McFadden et al. | 244/207 |
| 5,255,881 | 10/1993 | Rao | 244/199 |
| 5,297,764 | 3/1994 | Haney | 244/199 |
| 5,562,414 | 10/1996 | Azuma | 416/90 A |
| 5,806,807 | 9/1998 | Haney | 244/199 |

OTHER PUBLICATIONS

Gad–el–Hak, M. et al., "Control of the Discrete Vortices from a Delta Wing," AIAA Journal, vol. 25, No. 8, pp. 1042–1049 (1987).

Guillot, S. et al., "Delay of Vortex Breakdown over a Delta Wing via Near–Core Blowing," 36th Aerospace Sciences Meeting and Exhibit, Jan. 12–15, 1998, Reno, NV, Abstract No. AIAA 98–0315 (1998).

Malcolm, G.N. et al., "Flow Visualization Study of Vortex Manipulation on Fighter Configurations at High Angles of Attack," AGARD (Advisory Group for Aerospace Research and Development) CP—413 (1986).

Seginer, A. et al., "Performance Augmentation of a 60–Degree Delta Aircraft Configuration by Spanwise Blowing," J. Aircraft, vol. 23, No. 11, pp. 801–807 (1986).

Shih, C. et al., "Trailing–Edge Jet Control of Leading–Edge Vortices of a Delta Wing," AIAA Journal, vol. 34, No. 7, pp. 1447–1457 (1996).

Wood, N.J. et al., "Control of Vortical Lift on Delta Wings by Tangential Leading–Edge Blowing," J. Aircraft, vol. 25, No. 3, pp. 236–243 (1988).

*Primary Examiner*—Galen Barefoot
*Attorney, Agent, or Firm*—Bonnie J. Davis; John H. Runnels

[57] ABSTRACT

Vortical lift over a highly swept wing can be controlled by stabilizing or strengthening the major vortex by a small continuous jet of air, or a pulsating jet, near the core of the vortex. This method relies on the natural inductive action of the vortex swirling flow to entrain the injected air into the core of the vortex. When the additional momentum from the blowing air becomes aligned with the vortex mean flow direction, the vortex is stabilized and vortex breakdown is delayed.

36 Claims, 8 Drawing Sheets

VORTICAL LIFT CONTROL OVER A HIGHLY SWEPT WING

This invention pertains to a method to control vortical lift by stabilizing or strengthening the vortex over a highly swept wing, e.g., a delta wing.

The current demand for improved maneuverability of fighter aircraft and missiles has led to extensive studies of the flow of air over highly swept wings and other systems that depend on lift from the generation of vortices. The main focus of these studies, especially regarding delta wings, has been to control the lift created by the pair of strong leading-edge vortices that provide lift for the aircraft. In a delta wing, vortex breakdown or instability results in large variations in lift, drag and rolling moment, especially at high angles of attack ("alpha" or "α"). The ability to perform high-alpha maneuvers without encountering such instabilities is needed to enable the next generation of aircraft to maneuver beyond the ability of their counterparts of today. Thus in a swept wing structure, which depends on the creation of vortices for lift, the goal is to preserve and stabilize the vortices.

The role of vortices in providing lift for a swept wing configuration is in stark contrast to the role of vortices for a conventional wing. In a conventional wing, lift is the result of air movement across opposite surfaces at unequal velocities, and is not due to vortex creation. The air flow across the upper wing surface is faster than the air flow across the lower wing, creating a negative pressure or lift component. Vortices are generated from the ends of a conventional wing, but are undesirable. The vortices create drag on the airfoil structure, and can also create a hazard for any downstream aircraft. Thus, the focus of research concerning vortices created by a conventional wing has been to find methods to attenuate the vortices, including methods that use blowing air. See U.S. Pat. Nos. 2,477,461; 3,841,587; 3,936,013; 5,297,764; and 5,806,807.

U.S. Pat. No. 3,881,669 describes injecting an air jet into the core of the vortex at a momentum of such magnitude to make the wing tip vortex unstable.

U.S. Pat. No. 3,508,561 describes a method to prevent shedding of the wing tip vortex by removing fluid from the vortex core to destabilize the vortex.

U.S. Pat. No. 3,596,854 describes a method to redirect the air from the top surface of the wing into a vortex chamber, which then discharges the air from the wing tips.

Additional research has focused on methods to prevent flow separation across the wing by blowing air across the surface of the wing, termed "spanwise blowing." See U.S. Pat. Nos. 3,480,234; 3,525,486; and 4,860,976.

In contrast, in a highly swept wing configuration, the goal is to maintain or increase lift by preserving the structure and stability of the pair of vortices formed over the wings, or by creating new vortices. Two methods to modify the vortices involve air blowing from the leading edge of the wing either by blowing along the edge from near the apex or by tangential blowing through a slot in the leading edge. See A. Seginer et al., "Performance Augmentation of a 60-Degree Delta Aircraft Configuration by Spanwise Blowing," J. Aircraft, vol. 23, no. 11, pp. 801–807 (1986); and N. J. Wood et al., "Control of Vortical Lift on Delta Wings by Tangential Leading-Edge Blowing," J. Aircraft, vol. 25, no. 3, pp. 236–243 (1988).

U.S. Pat. No. 5,255,881 describes a spanwise blowing system that blows air perpendicular to the fuselage to artificially create new vortices to increase lift at low angles of attack.

Another method suggested to stabilize the vortex is by blowing along the trailing-edge of the wing. See C. Shih et al., "Trailing-Edge Jet Control of Leading-Edge Vortices of a Delta Wing," AIAA Journal, vol. 34, no. 7, pp. 1447–1457 (1996).

Previous work has also attempted to control yaw and roll at high angles of attack by blowing air along the fuselage. However, this work found that blowing aft from the apex of the fuselage was not particularly effective in altering the vortex burst point (or breakdown). See G. N. Malcolm et al., "Flow Visualization Study of Vortex Manipulation on Fighter Configurations at High Angles of Attack," AGARD (Advisory Group for Aerospace Research and Development) CP-413, (1986).

Under certain circumstances, the main vortex over a delta wing begins as a series of smaller, discrete vortices along the leading edge whose behavior in rolling into the major vortex can be affected by periodic pulsating blowing from the leading edge. See M. Gad-el-Hak et al., "Control of the Discrete Vortices from a Delta Wing," AIAA Journal, vol. 25, no. 8, pp. 1042–1049 (1987). Periodic or pulsating blowing has been shown to potentially achieve comparable results to steady blowing, resulting in a need for less compressed air and less momentum for the blown air.

The dynamics of fluid flow over a delta wing are very similar in water and air. In fact, many researchers conducted tests in a water tunnel to better visualize the vortex. See Shih et al., 1996; Malcolm et al., 1986; and Gad-el-Hak et al., 1987.

Each of the above methods to modify the swept wing vortices has met with limited success. Often the benefit of a vortex control system based on blowing air does not outweigh the power requirements for the compressor needed to generate the blowing air. The blowing air is either bled from the compression stage of the engine or is produced from a reservoir of compressed air. Improvements in blowing efficiency are needed if the blowing technique to delay vortex breakdown is to be practical.

There are other reports on using air flow either to move the location of a vortex or to generate a vortex to decrease noise from a rotorcraft or a turbofan engine. See U.S. Pat. Nos. 4,175,640 and 5,562,414.

U.S. Pat. No. 3,508,561 describes a method to perpetuate a vortex by the removal of fluid at substantially the same rate that it enters the core, or to destroy or eliminate the vortex by the addition of fluid to the core.

We have discovered that vortical lift over a highly swept wing can be controlled by stabilizing or strengthening the major vortex by a small continuous jet of air, or a pulsating jet, near the core of the vortex. This method relies on the natural inductive action of the vortical swirling flow to entrain the injected air at least partially into the core of the vortex. When the additional momentum from the blowing air becomes aligned with the vortex mean flow direction, the vortex is stabilized and vortex breakdown is delayed.

APPARATUS

Wind Tunnel

All experiments were performed in a subsonic wind tunnel facility. The wind tunnel had a 12:1 contraction (the funnel-shape entrance from the blowing source to the tunnel), with a honeycomb and screens to reduce freestream turbulence. The test tunnel section was 2.4 m long, 0.46 m high, and 0.6 m wide. The wind tunnel was powered by an axial fan capable of delivering 30,000 cfm (14.2 m$^3$/s). The pitch of the fan blades was adjustable to achieve velocities ranging from about 12.5 m/s to about 57 m/s. For each of the experiments reported below, the freestream velocity was 12.5 m/s. This velocity corresponded to a Reynolds number of 260,000 based on the root chord ("c") length of the delta wing model. The root chord is the length of the wing root, the side of the wing along the fuselage.

The wind tunnel facility was equipped with a 7 W argon ion laser (Specta Physics Stabilite 2017, Mountain View, Calif.) and a Rosco 1500 Smoke Generator (Rosco, Stamford, Conn.), both used to visualize the air flow. Photographs of flow images were taken with a Pulnix CCD camera (Pulnix America, Inc., Sunnyvale, Calif.) attached to a computer with a frame grabber. An Aerometrics Laser Doppler Velocimetry system (Aerometrics, Sunnyvale, Calif.) was used for velocity measurements.

Delta Wing Model

Figure 1:
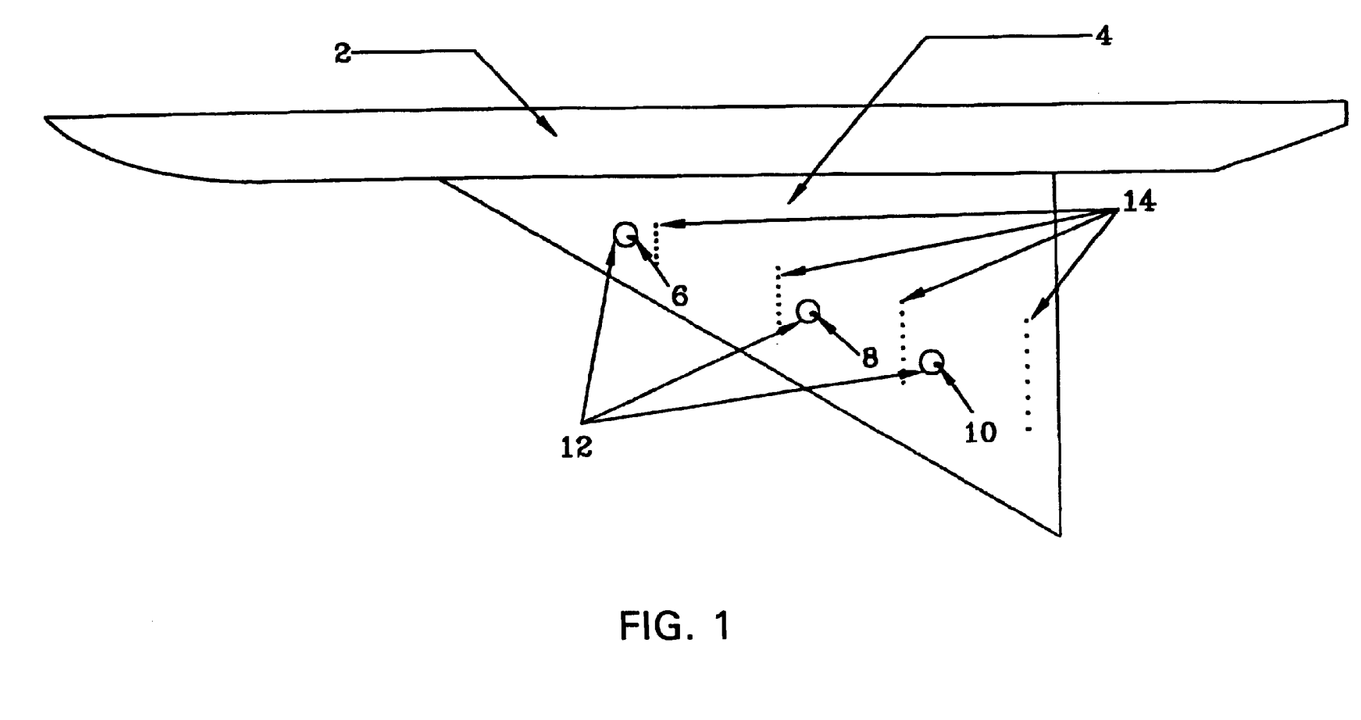
FIG. 1 illustrates the delta wing model used in the examples.

The delta wing model used in the experiments below was a half-span model comprising half a fuselage and half a wing as shown in FIG. 1. This model was easily mounted on the inner wall of the wind tunnel test section. As seen in FIG. 1, the delta wing 4 had a 60° sweep angle, a 34.3 cm root chord (c), and a 1.3 cm thickness, with a sharp, beveled leading edge. The sweep angle was considered 0° when the leading edge of the wing was perpendicular to the fuselage. The 71.3 cm fuselage 2 was half a cylinder measuring 14.0 cm in diameter with an ogive nose and a boat tail. The model was anchored to the wind tunnel in a manner that allowed for rotation to change the angle of attack ($\alpha$) from +35° to −35°. An $\alpha$ of 15° was used in all experiments reported here unless otherwise noted.

All of the passageways used to supply the jets with air were located inside the wing. Three disks 12 with a 1.2 cm diameter were mounted flush with the wing, and were located below the core of the vortex at a local wing span of 66%. The local wing span placement is expressed as a percentage of the total width of the wing measured on a line perpendicular to the root chord that passes through the nozzle. Air jets could exit from each of the disks through a 0.08 cm nozzle drilled in the disk with the desired pitch angle. The forward nozzle 6 was located on the wing at x/c=30%; the middle nozzle 8 at x/c=60%; and the aft nozzle 10 at x/c=80%, where "x" is the distance of the nozzle (or aperture) from the apex of the wing measured in a direction parallel to the root chord, and "c" is the length of the root chord of the wing. For any trial, each disk could be replaced with a solid disk such that only one or two disks would have blowing air at any one time. The nozzle of a disk was drilled with a known pitch angle ($\theta_p$), defined as the elevation angle from the surface of the wing. The pitch angles of interest included angles ($\theta_p$) varying from about 5° to about 90° from the horizontal, with a preferred pitch angle from about 25° to about 45°. Each disk 12 could be rotated in the wing to give the nozzle a different azimuthal angle ($\theta_{azimuth}$). The azimuthal angle ($\theta_a$) is defined in reference to the direction of freestream flow. The freestream velocity in a wind tunnel experiment represents the flight speed of an aircraft, but the direction is opposite. An $\theta_{azimuth}$=0° is blowing away from the direction of the freestream; and $\theta_{azimuth}$=90° would be blowing in a direction pointing normal to the direction of freestream flow, i.e., directly away from the fuselage in an aircraft with zero yaw. The azimuthal angles of most interest are those from about 100° to about 245°, with a preferred azimuthal angle from about 135° to about 180°.

The model was also equipped with solenoid valves to allow the jets to be pulsed. Air pressure on the wing surface was measured through 30 pressure taps 14 (0.08 cm diameter) as shown at four general locations on wing 4.

Flow Visualization

Visualization of the air flow over the model provided a simple means to determine the location of vortex breakdown. Air flow was visualized by smoke and illuminated with an argon ion laser. The laser beam passed through a cylindrical lens to create a sheet of light that illuminated a cross section of air flow over the wing. A gimbal-mounted mirror allowed the laser sheet to be swept along the length of the wing. A video camera was mounted above the test section of the wind tunnel and viewed the delta wing model through a PLEXIGLAS® window. The vortex core was easily identified as a small black hole in the center of the vortex. When vortex breakdown occurred, the hole disappeared. The vortex breakdown location was the chordwise position (x/c) where the core of the vortex "blinked;" i.e., where there was rapid collapse and reforming of the core.

Velocity Measurement

Axial velocities were measured in the vortex using laser doppler velocimetry, as described in F. Durst et al., Principles and Practice of Laser-Doppler Anemometry, Academic Press, New York (1976). The velocities were measured in grids oriented normal to the freestream direction. The velocity plots showed an accelerated flow towards the vortex core in vortices upstream to breakdown, and a decelerated flow downstream from breakdown. In fact, it was not uncommon for negative velocities to be measured in the wake-like flow behind the breakdown.

Injection of air from a nozzle placed below the vortex on a model delta wing was used to add momentum into the leading edge vortex, resulting in a stronger and more stable vortex. Experiments were performed on a delta wing with a 60° sweep angle at a Reynolds number of 260,000. The model was mounted for angles of attack ($\alpha$) from 0° to 28°. At $\alpha$=15°, the vortex breakdown location moved from a location at 35% of the length of the wing root chord to 100%. For most experiments the blowing coefficient was $C\mu$=0.013. (The blowing coefficient is the ratio of air jet momentum to ambient flow momentum.) Though conditions of air blowing were optimized for $\alpha$=15°, blowing proved effective in stabilizing the vortex over the range of attack angles tested.

Vortical air flow was observed by illuminating smoke with a laser sheet. The visual images showing the effect of jet blowing on the vortex core were used to determine the vortex trajectory and breakdown location. The mean axial velocities were measured and mapped across the vortex at several wing locations using Laser Doppler Velocimetry. Vortex breakdown resulted in a strong reduction in the mean velocity in the core region, and even the appearance of reverse flow. By controlled jet injection, a substantial delay of vortex breakdown was evidenced by the acceleration of the velocity in the core.

Initial tests demonstrated that the most effective location for the air jet injection was downstream of the wing apex, at a location where the vortex was already partially developed. However, potential effective locations of the air jet or air jets are from x/c=15% to 100%. The most preferred locations are at x/c values from about 25% to about 100%. Additionally, the placement of the nozzle on the wing with reference to the vortex was important. The most effective placement was near or under the vortex core. This corresponded to a placement on the wing between about 55% and about 80% of the local wing span. The optimal azimuthal angle of injection for the jet depended on the blowing conditions, the location of the jet nozzle, and the angle of attack. It also depended on the wing geometry and the yaw of the aircraft. The optimal angles (both azimuthal and pitch angle) of injection were the angles that were most effective in stabilizing or strengthening the core of the vortex. It is believed that the stabilization or strengthening is due to the air jet being swept into the core of the vortex; i.e., the induced tangential velocity of the vortex sweeps the air jet, directing it into the vortex core.

EXAMPLE 1

Breakdown Dynamics

Figure 2A:
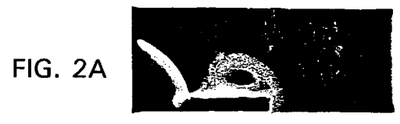
FIG. 2A illustrates a cross-sectional view of the vortex at x/c=30% without blowing.
Figure 2B:
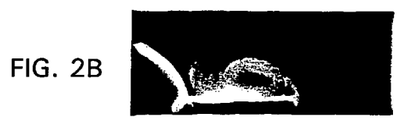
FIG. 2B illustrates a cross-sectional view of the vortex at x/c=40% without blowing.
Figure 2C:
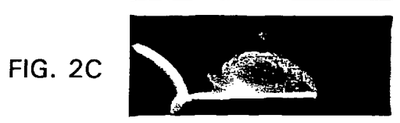
FIG. 2C illustrates a cross-sectional view of the vortex at x/c=50% without blowing.
Figure 2D:
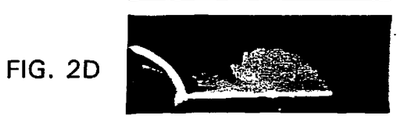
FIG. 2D illustrates a cross-sectional view of the vortex at x/c=60% without blowing.
Figure 2E:
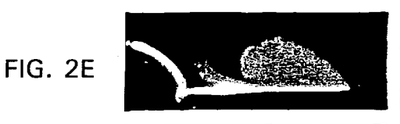
FIG. 2E illustrates a cross-sectional view of the vortex at x/c=70% without blowing.
Figure 2F:
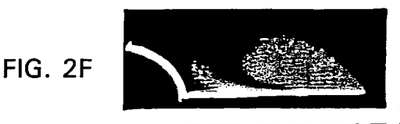
FIG. 2F illustrates a cross-sectional view of the vortex at x/c=80% without blowing.
Figure 2G:
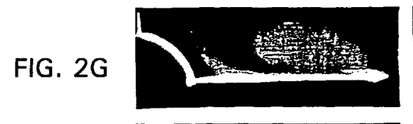
FIG. 2G illustrates a cross-sectional view of the vortex at x/c=90% without blowing.
Figure 2H:
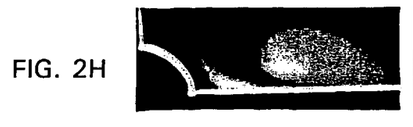
FIG. 2H illustrates a cross-sectional view of the vortex at x/c=100% without blowing.
Figure 2I:
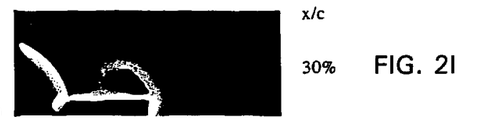
FIG. 2I illustrates a cross-sectional view of the vortex at x/c=30% with blowing.
Figure 2J:
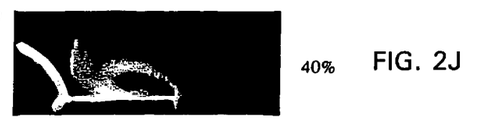
FIG. 2J illustrates a cross-sectional view of the vortex at x/c=40% with blowing.
Figure 2K:
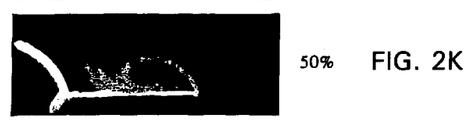
FIG. 2K illustrates a cross-sectional view of the vortex at x/c=50% with blowing.
Figure 2L:
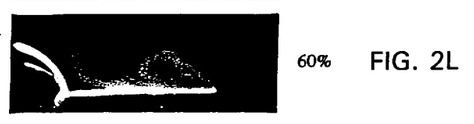
FIG. 2L illustrates a cross-sectional view of the vortex at x/c=60% with blowing.
Figure 2M:
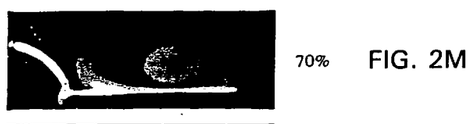
FIG. 2M illustrates a cross-sectional view of the vortex at x/c=70% with blowing.
Figure 2N:
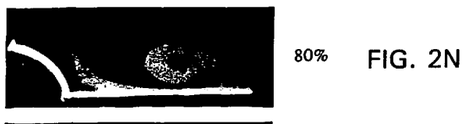
FIG. 2N illustrates a cross-sectional view of the vortex at x/c=80% with blowing.
Figure 2O:
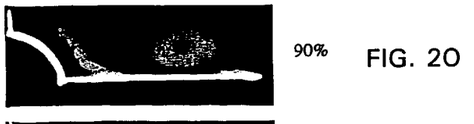
FIG. 2O illustrates a cross-sectional view of the vortex at x/c=90% with blowing.
Figure 2P:
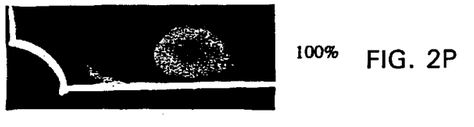
FIG. 2P illustrates a cross-sectional view of the vortex at x/c=100% with blowing.

With no air injected from any of the nozzles, the visualization technique described above illustrated the natural breakdown dynamics. FIGS. 2A–2H are images taken from various locations on the wing, from x/c=30% to 100%, with no air blowing. FIGS. 2I–2P show images from the same locations with blowing air. In FIGS. 2A–2P, the absence of smoke in the center of the vortex indicated a vortex with a well-organized core. As the vortex broke down, smoke was seen to become more diffused, and the hole disappeared. This is illustrated in FIG. 2D at x/c=60%. FIGS. 2I–2P show that with blowing, the core of the vortex could be seen even at the trailing edge of the wing (x/c=100%). In this experiment, air was blown from nozzle 6 at x/c=30%; the azimuthal angle was 157.5°; and the pitch angle was 35°. The blowing coefficient was $C\mu$=0.013.

The location along the wing of vortex breakdown was itself a periodic phenomenon, oscillating by as much as 5% along the chord. The frequency was observed to be approximately 5 Hz, which corresponds to a Strouhal number of 0.13 when normalized by the size of the wing and the air velocity. This agreed with published results of wing models with a 60° sweep angle. See M. Menke et al, "Self-Oscillation of Vortex Breakdown Location over Delta Wings," AIAA Paper 97–0744 (1997).

EXAMPLE 2

Effects of Various Blowing Parameters

Experiments were conducted to determine the effects of blowing location along the chord, azimuthal angle ($\theta_{azimuth}$), pitch angle ($\theta_p$), and blowing momentum. The lift coefficient $C_L$ was measured using a 15° angle of attack ($\alpha$) and a blowing coefficient ($C\mu$) of 0.013. The lift coefficient was measured with a simple cantilever beam force balance. The force balance comprised a square aluminum beam with eight sets of strain gages. Each side of the beam had two strain gages, one near the bottom of the beam and the other near the top. Each gage measured strain at the surface of the beam. From the strain at the surface, a bending moment was calculated. With strain gages on each side, the bending moment was calculated about each transverse axis of the beam. With this arrangement the resulting lift ($C_L$) and drag ($C_D$) coefficients were calculated. See L. Qiang, "Wind Tunnel Tests for Wind Loads on Open Frame Petrochemical Structures," A Thesis Submitted to the Graduate Faculty of Louisiana State University and Agricultural and Mechanical College, for a Master of Science in Civil Engineering, December 1998 (1998).

Figure 3A:
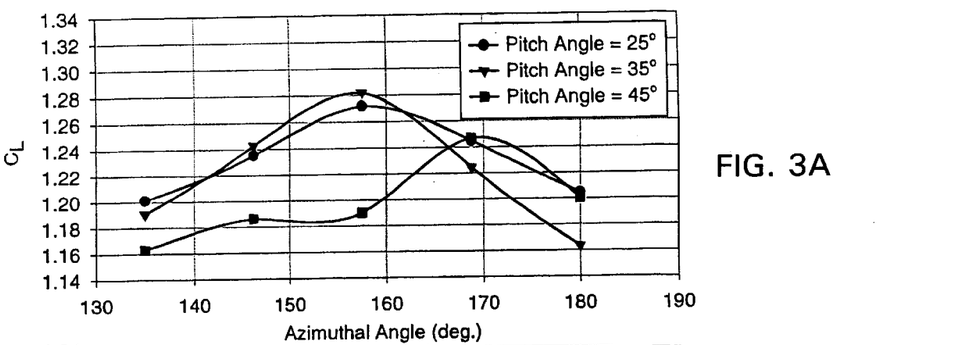
FIG. 3A illustrates the effects of the azimuthal and pitch angles of the nozzle on blowing performance for the nozzle closest to the apex.
Figure 3B:
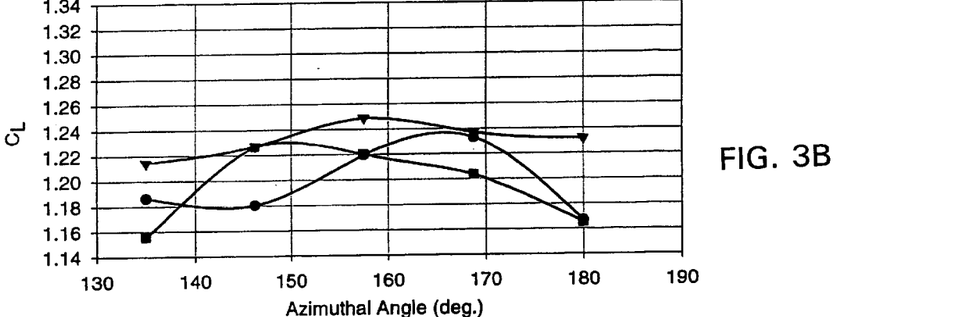
FIG. 3B illustrates the effects of the azimuthal and pitch angles of the nozzle on blowing performance for the middle nozzle.
Figure 3C:
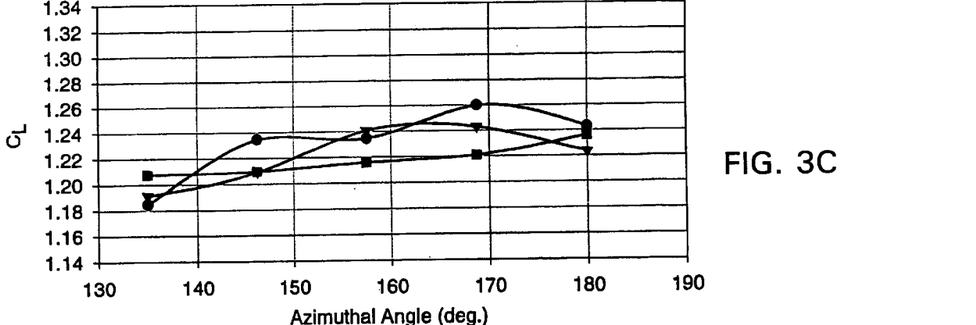
FIG. 3C illustrates the effects of the azimuthal and pitch angles of the nozzle on blowing performance for the nozzle closest to the trailing wing edge.

The results are shown in FIGS. 3a, 3b, and 3c, respectively for each of the three nozzles. FIG. 3A shows data generated from upstream nozzle 6; FIG. 3b from middle nozzle 8; and FIG. 3c from downstream nozzle 10. The lift coefficient for no blowing was measured to be $C_L$=1.14. As seen in FIGS. 3A, 3B, and 3C, all curves showed increased values of $C_L$ above 1.14, indicating an improvement in lift under all conditions tested. As seen by comparing FIG. 3A to both FIGS. 3B and 3C, the greatest increase in lift ($C_L$=1.28) occurred when blowing air through the first nozzle at $\theta_{azimuth}$=157.5° and $\theta_p$=35°. Interestingly, the third nozzle increased lift with the least variability when changing azimuthal angle or pitch, as seen in FIG. 3C. The highest $C_L$ for the third nozzle was seen when blowing air at $\theta_{azimuth}$= 168.7° and $\theta_p$=25°. Also, the third nozzle performed well over a wider range of pitch angles. (Data not shown)

Moreover, the effectiveness of the upstream nozzle proved more sensitive to blowing momentum of the air jet than did the effectiveness of the downstream nozzle, especially at higher air jet momentum. For the upstream nozzle, the optimal blowing momentum was 0.016. At higher values of jet momentum, performance of the upstream nozzle decreased. However, the downstream nozzlde continued to increase performance, even at the highest jet momentum tested. (Data not shown)

EXAMPLE 3
Axial Velocities With and Without Blowing

To measure axial velocities along the wing, the upstream nozzle was used. The blowing conditions were the same as in Example 1; and the angle of attack ($\alpha$) was 15°.

FIGS. 4A, 4B, 5A, 5B, 6A, and 6B show contour maps of the axial velocities, as normalized by the freestream velocity, at three locations on the wing. In each figure, "y" is the perpendicular distance from the fuselage; "z" is the true vertical distance above the wing; and "local span" is the width of the wing at that location (i.e., from the fuselage to the leading edge of the wing).

Normalized velocity was obtained by dividing the measured velocity by the freestream velocity. Thus, a value of 2.0 is a velocity of twice the freestream velocity; and a value of 0.5 is one-half the freestream velocity. Where the velocity decreases toward the center, vortex breakdown has occurred somewhere upstream of this point. Conversely, when the velocity increases in the core, the vortex is strong and any vortex breakdown is either further aft or does not occur on the wing.

Figure 4A:
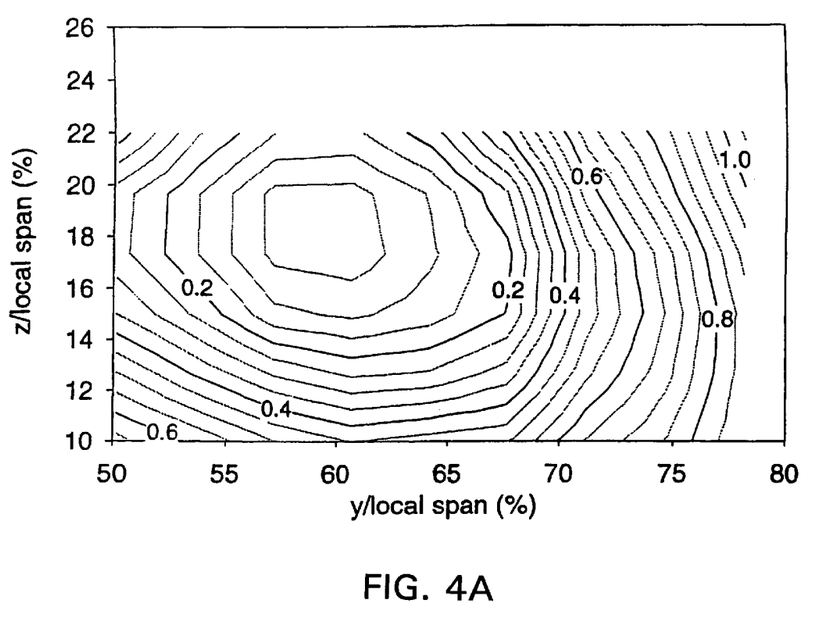
FIG. 4A illustrates a contour map of the axial velocities of the vortex at x/c=55% without blowing.
Figure 4B:
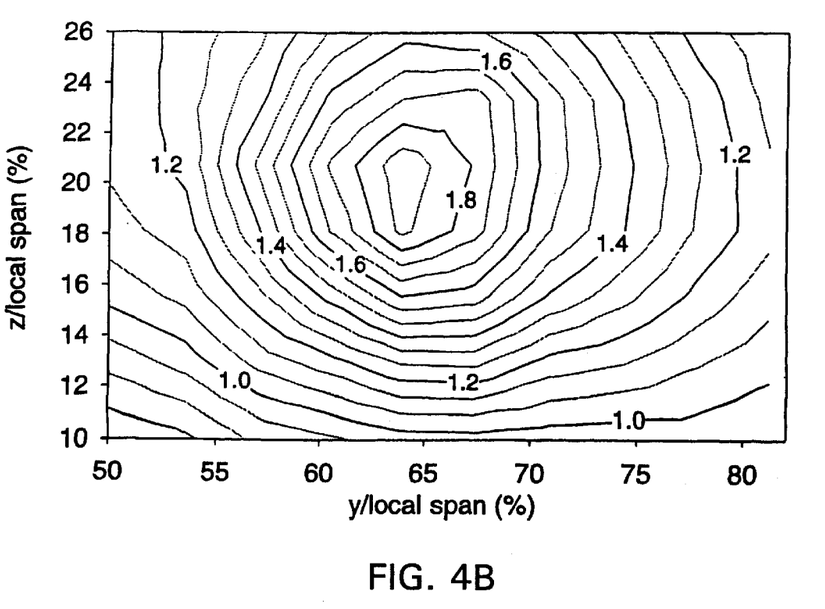
FIG. 4B illustrates a contour map of the axial velocities of the vortex at x/c=55% with blowing.

FIG. 4A shows a contour map of axial velocities at x/c=55% without blowing. The contour map indicated a decelerated core with the average velocity close to zero, indicating that vortex breakdown has occurred prior to this point. FIG. 4B shows the axial velocities at the same point with jet blowing. In contrast to the non-blowing map, the blowing contour map showed velocities in the core almost twice the freestream velocity, indicating a strong vortex.

Figure 5A:
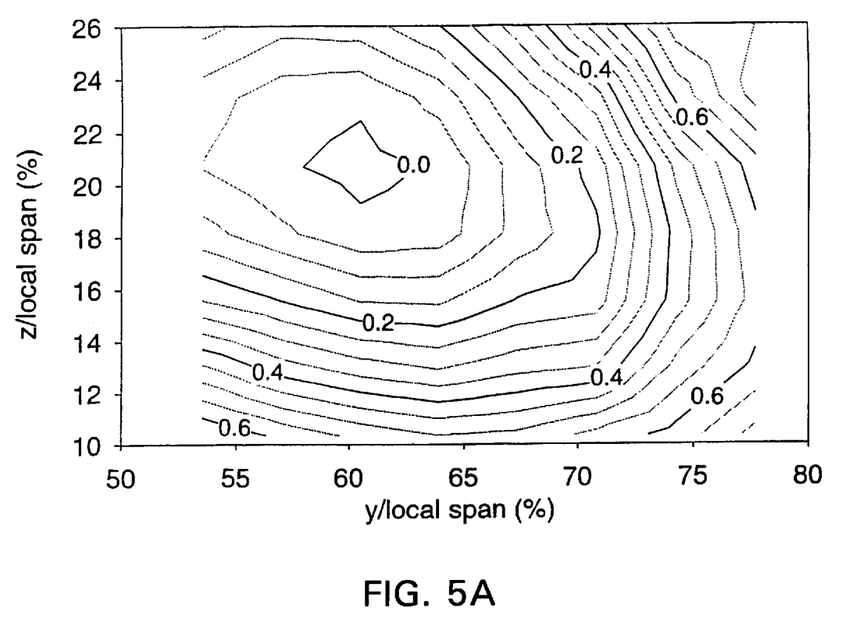
FIG. 5A illustrates a contour map of the axial velocities of the vortex at x/c=75% without blowing.
Figure 5B:
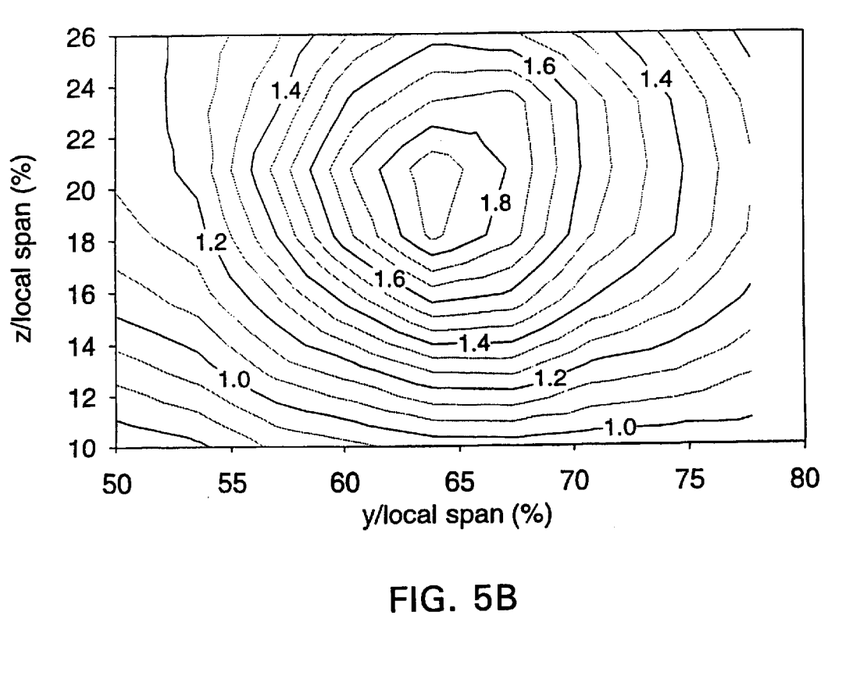
FIG. 5B illustrates a contour map of the axial velocities of the vortex at x/c=75% with blowing.

Similar results were seen at x/c=75% in FIGS. 5A and 5B. Again, without blowing, FIG. 5A showed a decelerated core with a velocity of zero or less at the core. FIG. 5B, with jet blowing, showed core velocities almost twice the freestream velocity, again indicating maintenance of a strong vortex by air injection from the most forward nozzle.

Figure 6A:
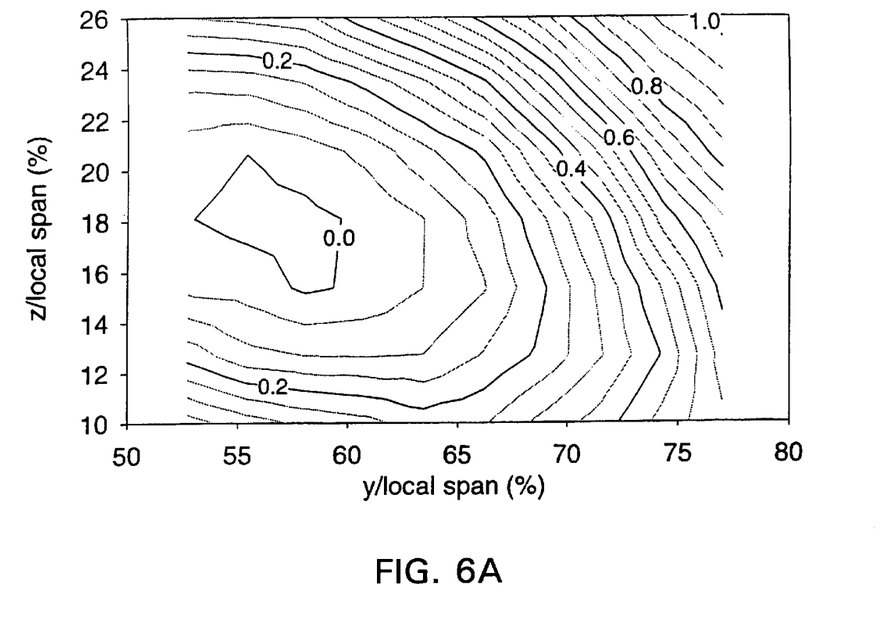
FIG. 6A illustrates a contour map of the axial velocities of the vortex at x/c=95% without blowing.
Figure 6B:
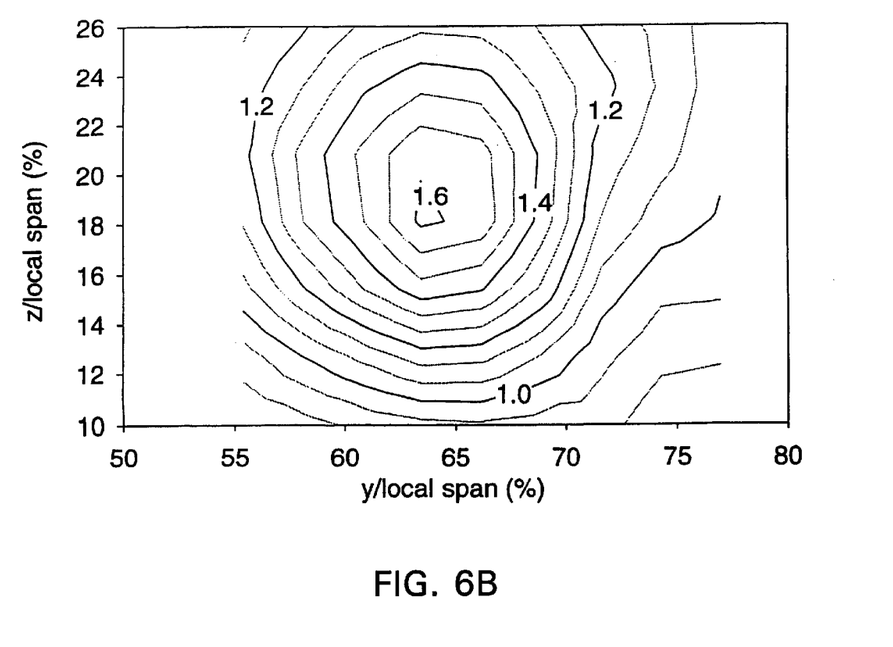
FIG. 6B illustrates a contour map of the axial velocities of the vortex at x/c=95% with blowing.

Even at x/c=95%, FIGS. 6A and 6B indicated that the jet blowing from the first nozzle 6 at x/c=30% maintained the vortex almost to the end of the wing. FIG. 6B, with blowing, showed a core velocity 1.6 times the freestream velocity, indicating a strong vortex near the trailing edge of the wing.

Thus, at these blowing conditions, the vortex was maintained almost the entire length of the delta wing at $\alpha$=15° by blowing a stream of air from a nozzle located at x/c=30% of the wing.

EXAMPLE 4
Pressure Distribution on Wing Surface

Figure 7A:
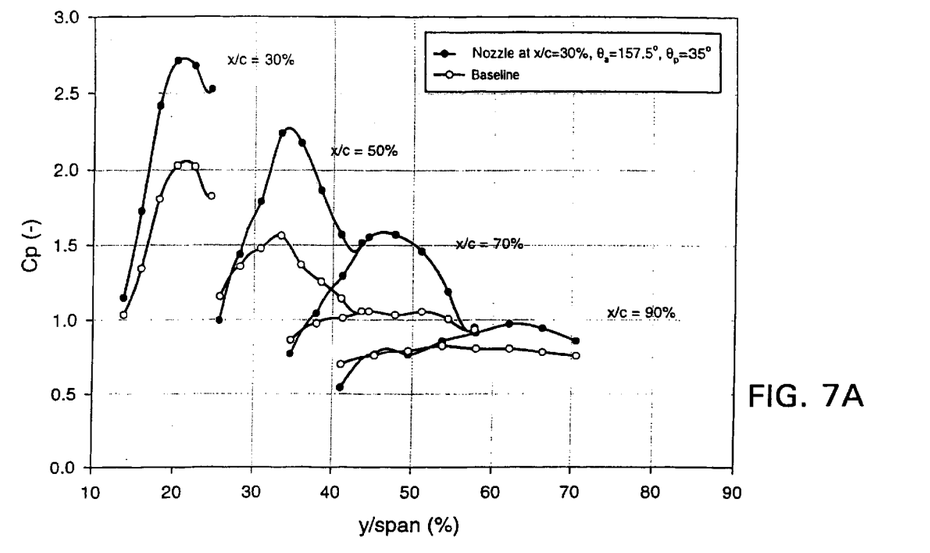
FIG. 7A illustrates the pressure coefficients at various points on the surface of the wing with and without blowing air from the nozzle at x/c=30%.

Pressure on the wing surface was measured through the pressure taps 14 drilled in the wing as shown in FIG. 1. Each hole was connected to an Auto Tran, Model 600D2"WC 12D4 Pressure Transmitter (Auto Tran Inc., Minntonka, Minn.). FIG. 7A shows the pressure coefficients on the surface of the wing at x/c=30%, 50%, 70%, and 90%. The air was blown from the first nozzle and the blowing conditions were as above in Example 1. Each curve showed a peak in the negative pressure coefficient that corresponded to a location above the wing beneath the vortex. The peak was greater with blowing air than without blowing at all locations measured. This provides further evidence that the blowing of air created a stronger vortex capable of generating a greater vortical lift power than without the blowing jet.

Figure 7B:
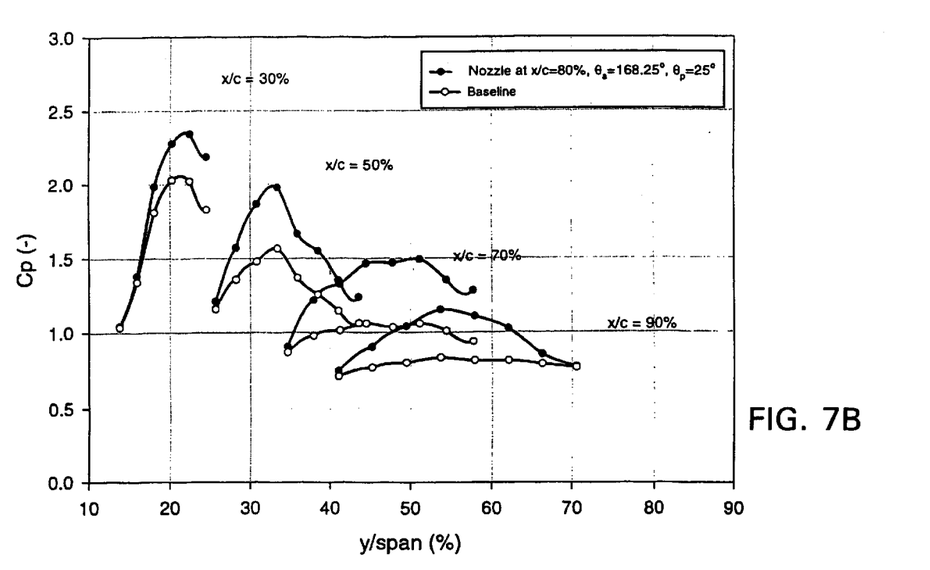
FIG. 7B illustrates the pressure coefficients at various points on the surface of the wing with and without blowing air from the nozzle at x/c=80%.

FIG. 7B shows the pressure distribution along the wing when the most aft nozzle (x/c=80%) was blowing with a $\theta_a$=168.25° and $\theta_p$=25°, the most effective blowing angles for this nozzle at a 15° angle of attack and blowing coefficient of 0.013. This figure illustrates that blowing with only the aft nozzle was also effective in increasing pressure along the wing. In fact at x/c=90°, the pressure increase was greater than seen in FIG. 7A for blowing with the most forward nozzle. A comparison of the blowing parameters of FIGS. 7A and 7B indicates that the most effective pitch and azimuthal angle change with location of the nozzle along the wing.

Thus blowing air from various locations along the wing increased the lift component of the vortex in a delta wing. However, blowing air from the middle nozzle was not as effective in increasing lift. (Data not shown)

EXAMPLE 5
Effect of Blowing on Wing Performance at Various Angles of Attack

To illustrate the performance of a wing with and without blowing the coefficients of both lift and drag were measured as a function of angle of attack. Air was blown from the first nozzle; and the blowing parameters were $\theta_{azimuth}$=157.5°, $\theta_p$=35°, and $C\mu$=0.013. These were the optimal conditions for an angle of attack of 15°. The coefficient of lift ($C_L$) was measured as discussed above. The coefficient of drag ($C_D$) was measured as described in Example 2.

Figure 8:
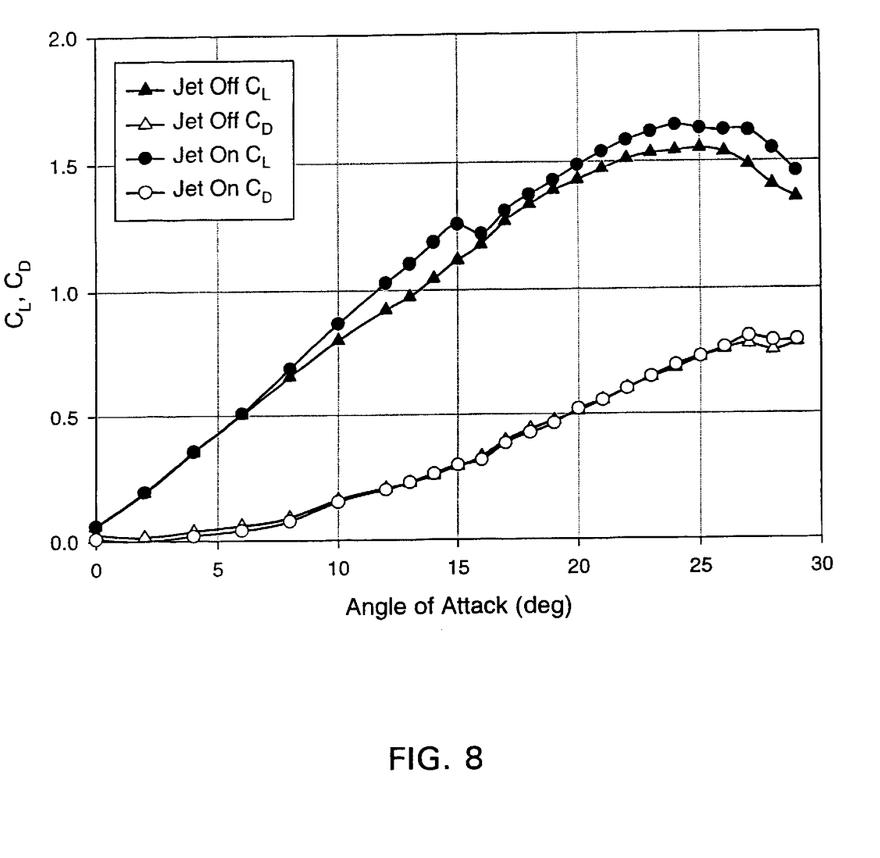
FIG. 8 illustrates the lift and drag coefficients at various angles of attack with and without blowing air.

FIG. 8 shows that performance of the novel wing was greater at all angles of attack. Without blowing, there was a steady increase in $C_L$ until $\alpha$=25°, above which lift decreased. The point at which the lift curve begins to drop is referred to as the "stall angle." The stall angle without blowing was thus 25°. In contrast, with blowing, the $C_L$ curve leveled off at angles from about 25° to about 27° before dropping.

Although a small drop was seen at 15° with air blowing, ideally this curve should be smooth. The smoothness of this curve could be improved either by blowing from more than one location on the wing or by an active control system that could quickly change the blowing conditions as the angle of attack changes, and thus maintain optimal blowing conditions for each angle. A smoother lift curve with higher gains in lift over a broader range of angles of attack could then be generated.

Preliminary data show that the lift curve for the third nozzle (closest to the trailing edge) is smoother, and that overall the gain may be better over a broader range of $\alpha$'s than for the first nozzle.

EXAMPLE 6
Effect of Blowing from Multiple Nozzles

Future experiments will test the interaction of blowing from multiple nozzles, at various angles of attack, to find the optimal blowing conditions for each attack angle. Based on the results shown in FIGS. 7A and 7B, blowing from both the forward nozzle and the aft nozzle should greatly increase the pressure component along the wing. The forward nozzle would have a greater effect on the forward part of the wing, and the aft nozzle on the aft portion.

Although the above results were obtained with continuous flows of air, a person skilled in the art would understand that similar results could be achieved with pulsating jets at high frequencies. Also, although the above results were obtained on a delta wing model, similar results should also be achieved with other swept wing structures that create a major lift vortex. Additionally, the above results were obtained using air as the fluid both across the model and for the nozzle injection, but similar results would be seen with an injection of a different gas. Moreover, similar results should be obtained using water as the fluid across the model and as the injected fluid.

As used in the specification and claims, the term "aircraft" includes all airborne vehicles, including but not limited to, airplanes, rockets, and missiles.

EXAMPLE 7
Active Control of Vortex Breakdown

Future experiments will test the application of an active controller with the ability to sense the natural frequency of the dynamic breakdown of the vortex. One method of timing the frequency of the pulsating jet to counteract the natural breakdown frequency of the vortex is through an open loop control system. The open loop system will activate a pulsating jet at frequencies predetermined to be effective in delaying the vortex breakdown. Without wishing to be bound by this theory, it is believed that the most effective frequency will be close to or approximately equal to the vortex breakdown frequency, which for example was 5 Hz under the conditions of Example 1.

Another method is to sense the natural breakdown frequency, and then to time the pulsations to match or approximate that frequency. This can be done through a closed loop controller. A closed loop controller will use pressure sensors embedded in the central section of the wing surface to detect fluctuations in the vortex breakdown frequency. Unsteady pressure signals will be fedback to the pulsating jet through phase delay circuitry. The pressure sensors will drive the jet pulsations at a frequency predetermined to be effective at delaying breakdown. Without wishing to be bound by this theory, it is believed that the most effective frequency will be close to or approximately equal to that of the breakdown. The pressure signal will be delayed such that the jet momentum pulsations will counteract the forces driving vortex breakdown, resulting in a stabilization and enhancement of the vortex.

The advantage of using a pulsating jet is that the blowing efficiency should be enhanced. Also, with an active control system the conditions of blowing will be optimized for the change in attack angle, yaw angle, flight speed, or wing geometry.

The complete disclosures of all references cited in this specification are hereby incorporated by reference. Also incorporated by reference is the complete disclosure of the following abstract: S. Guillot et al., "Delay of Vortex Breakdown over a Delta Wing via Near-Core Blowing," 36th Aerospace Sciences Meeting and Exhibit, Jan. 12–15, 1998, Reno, Nev., Abstract No. AIAA 98–0315 (1998). In the event of an otherwise irreconcilable conflict, however, the present specification shall control.

We claim:

1. A controller to enhance or stabilize a vortex created by fluid flowing over a swept wing; said controller comprising a source of pressurized fluid, and at least one aperture in the upper surface of the wing adapted to inject fluid from said source at least partially into the core of the vortex at a selected velocity and in a selected direction; wherein the position, velocity, and direction of the injected fluid enhance or stabilize the vortex.

2. An aircraft comprising one or more swept wings comprising a controller as recited in claim 1.

3. A controller as recited in claim 1, wherein the fluid is a gas.

4. A controller as recited in claim 1, wherein the fluid is a liquid.

5. A controller as recited in claim 1, wherein the swept wing is characterized by a wing root of chord length C measured from the apex of the swept wing; wherein the distance of said aperture from the apex, measured in a direction parallel to the wing root, is between about 0.15 C and about 1.0 C; and wherein the distance of said aperture from the wing root, measured in a direction perpendicular to the wing root, is between about 0.55 S and about 0.80 S; wherein S is the width of the swept wing measured in a line perpendicular to the wing root and passing through the aperture.

6. A controller as recited in claim 1, wherein the swept wing is characterized by a wing root of chord length C measured from the apex of the swept wing; wherein the distance of said aperture from the apex, measured in a direction parallel to the wing root, is between about 0.25 C and about 1.0 C; and wherein the distance of said aperture from the wing root, measured in a direction perpendicular to the wing root, is between about 0.60 S and about 0.75 S; wherein S is the width of the swept wing measured in a line perpendicular to the wing root and passing through the aperture.

7. A controller as recited in claim 1, wherein the swept wing is characterized by a wing root of chord length C measured from the apex of the swept wing; wherein the distance of said aperture from the apex, measured in a direction parallel to the wing root, is about 0.30 C; and wherein the distance of said aperture from the wing root, measured in a direction perpendicular to the wing root, is about 0.66 S; wherein S is the width of the swept wing measured in a line perpendicular to the wing root and passing through the aperture.

8. A controller as recited in claim 1, wherein the swept wing is characterized by a wing root of chord length C measured from the apex of the swept wing; wherein the distance of said aperture from the apex, measured in a direction parallel to the wing root, is about 0.80 C; and wherein the distance of said aperture from the wing root, measured in a direction perpendicular to the wing root, is about 0.66 S; wherein S is the width of the swept wing measured in a line perpendicular to the wing root and passing through the aperture.

9. A controller as recited in claim 1, wherein said aperture is movable such that the direction of the injected fluid may be selected, that direction being characterized by a selected pitch angle and a selected azimuthal angle.

10. A controller as recited in claim 9, wherein the pitch angle of said aperture is between about 5° and about 90° as measured from the surface of the wing.

11. A controller as recited in claim 9, wherein the pitch angle of said aperture is between about 15° and about 45° as measured from the surface of the wing.

12. A controller as recited in claim 9, wherein the azimuthal angle of said aperture is between about 100° and about 245° as measured from a direction opposite to that of fluid flow.

13. A controller as recited in claim 9, wherein the azimuthal angle of said aperture is between about 135° and about 180° as measured from a direction opposite to that of fluid flow.

14. A controller as recited in claim 1, wherein said controller comprises two or more said apertures.

15. A controller as recited in claim 1, wherein said controller is adapted to inject a steady flow of fluid at least partially into the core of the vortex.

16. A controller as recited in claim 1, wherein said controller is adapted to inject a pulsed flow of fluid at least partially into the core of the vortex.

17. A controller as recited in claim 16, wherein said controller is adapted to time the frequency of the pulsations of the fluid flow to a frequency approximately equal or higher than the natural frequency of the destabilization of the vortex.

18. A controller as recited in claim 1, wherein the swept wing has a leading edge, and wherein said aperture is not along the leading edge of the swept wing.

19. A method to enhance or stabilize a vortex created by a fluid flowing over a swept wing; said method comprising injecting a pressurized fluid through at least one aperture in the upper surface of the wing at least partially into the core of the vortex at a selected velocity and in a selected direction; wherein the position, velocity, and direction of the injected fluid enhance or stabilize the vortex.

20. A method to enhance or stabilize vortical lift as recited in claim 19, wherein the swept wing is attached to an aircraft.

21. A method to enhance or stabilize vortical lift as recited in claim 19, wherein the fluid is a gas.

22. A method to enhance or stabilize vortical lift as recited in claim 19, wherein the fluid is a liquid.

23. A method to enhance or stabilize vortical lift as recited in claim 19, wherein the swept wing is characterized by a wing root of chord length C measured from the apex of the swept wing; wherein the distance of said aperture from the apex, measured in a direction parallel to the wing root, is between about 0.15 C and about 1.0 C; and wherein the distance of said aperture from the wing root, measured in a direction perpendicular to the wing root, is between about 0.55 S and about 0.80 S; wherein S is the width of the swept wing measured in a line perpendicular to the wing root and passing through the aperture.

24. A method to enhance or stabilize vortical lift as recited in claim 19, wherein the swept wing is characterized by a wing root of chord length C measured from the apex of the swept wing; wherein the distance of said aperture from the apex, measured in a direction parallel to the wing root, is between about 0.25 C and about 1.0 C; and wherein the distance of said aperture from the wing root, measured in a direction perpendicular to the wing root, is between about 0.60 S and about 0.75 S; wherein S is the width of the swept wing measured in a line perpendicular to the wing root and passing through the aperture.

25. A method to enhance or stabilize vortical lift as recited in claim 19, wherein the swept wing is characterized by a wing root of chord length C measured from the apex of the swept wing; wherein the distance of said aperture from the apex, measured in a direction parallel to the wing root, is about 0.30 C; and wherein the distance of said aperture from the wing root, measured in a direction perpendicular to the wing root, is about 0.66 S; wherein S is the width of the swept wing measured in a line perpendicular to the wing root and passing through the aperture.

26. A method to enhance or stabilize vortical lift as recited in claim 19, wherein the swept wing is characterized by a wing root of chord length C measured from the apex of the swept wing; wherein the distance of said aperture from the apex, measured in a direction parallel to the wing root, is about 0.80 C; and wherein the distance of said aperture from the wing root, measured in a direction perpendicular to the wing root, is about 0.66 S; wherein S is the width of the swept wing measured in a line perpendicular to the wing root and passing through the aperture.

27. A method to enhance or stabilize vortical lift as recited in claim 19, wherein the aperture is movable such that the direction of the injected fluid may be selected, the direction being characterized by a selected pitch angle and a selected azimuthal angle.

28. A method to enhance or stabilize vortical lift as recited in claim 27, wherein the pitch angle of said aperture is between about 5° and about 90° as measured from the surface of the wing.

29. A method to enhance or stabilize vortical lift as recited in claim 27, wherein the pitch angle of said aperture is between about 15° and about 45° as measured from the surface of the wing.

30. A method to enhance or stabilize vortical lift as recited in claim 27, wherein the azimuthal angle of said aperture is between about 100° and about 245° as measured from a direction opposite to that of the fluid flow.

31. A method to enhance or stabilize vortical lift as recited in claim 27, wherein the azimuthal angle of said aperture is between about 135° and about 180° as measured from a direction opposite to that of the fluid flow.

32. A method to enhance or stabilize vortical lift as recited in claim 19, said method comprising injecting a pressurized fluid through at least two apertures as recited.

33. A method to enhance or stabilize vortical lift as recited in claim 19, wherein said injecting comprises injecting a steady flow of fluid at least partially into the core of the vortex.

34. A method to enhance or stabilize vortical lift as recited in claim 19, wherein said injecting comprises injecting a pulsed flow of fluid at least partially into the core of the vortex.

35. A method to enhance or stabilize vortical lift as recited in claim 34, wherein said injecting comprises injecting pulsed fluid at a frequency approximately equal or higher than the natural frequency of the destabilization of the vortex.

36. A method to enhance or stabilize vortical lift as recited in claim 19, wherein the swept wing has a leading edge, and wherein the aperture is not along the leading edge of the swept wing.

* * * * *